US009056551B2

(12) United States Patent
Mirzaei

(10) Patent No.: US 9,056,551 B2
(45) Date of Patent: Jun. 16, 2015

(54) BRAKING SYSTEM CONTACTOR CONTROL AND/OR MONITORING SYSTEM AND METHOD

(75) Inventor: Saeid Mirzaei, Greendale, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 178 days.

(21) Appl. No.: 13/609,055

(22) Filed: Sep. 10, 2012

(65) Prior Publication Data

US 2014/0071578 A1  Mar. 13, 2014

(51) Int. Cl.
*B60L 7/08* (2006.01)
*H01H 47/18* (2006.01)
*B60L 7/06* (2006.01)

(52) U.S. Cl.
CPC . *B60L 7/08* (2013.01); *H01H 47/18* (2013.01); *B60L 7/06* (2013.01); *B60L 2200/18* (2013.01); *B60L 2200/40* (2013.01); *B60L 2200/26* (2013.01)

(58) Field of Classification Search
CPC ............ H01H 2300/002; H01H 47/18; B60T 13/585; E02F 9/2217; B60L 7/08; B60W 10/00
USPC .......................................................... 361/196
See application file for complete search history.

(56) References Cited

U.S. PATENT DOCUMENTS 3,116,441 A    12/1963  Gieffers
3,505,566 A *   4/1970  Conrad ........................... 361/44
3,590,334 A     6/1971  Baker
3,876,918 A     4/1975  Komuro et al.
4,998,177 A *   3/1991  Takizawa et al. ............. 361/154
5,410,187 A     4/1995  Meyer
5,517,093 A     5/1996  Augustyniak et al.
5,564,657 A    10/1996  Dimsa et al.
5,568,349 A *  10/1996  Kowalewski ................. 361/154
2002/0174796 A1* 11/2002 Kumar et al. .............. 105/26.05
2007/0035903 A1*  2/2007 Sullivan et al. ................. 361/78
2009/0174349 A1*  7/2009 Iwashita et al. .......... 318/400.06
2009/0185335 A1*  7/2009 Kwon ........................... 361/643

FOREIGN PATENT DOCUMENTS

| CA | 2025592      | 9/1990  |
| CN | 1035020      | 8/1989  |
| CN | 2121750      | 11/1992 |
| CN | 2146779      | 11/1993 |
| CN | 2289296      | 8/1998  |
| JP | 07046707 A * | 2/1995  |

OTHER PUBLICATIONS

Fujita, Ryohei, Machine Translation of JP 07-046707, Drive Controller for Direct Current Motor, Feb. 14, 1995.*

* cited by examiner

*Primary Examiner* — Thienvu Tran
*Assistant Examiner* — Kevin J Comber
(74) *Attorney, Agent, or Firm* — Foley & Lardner LLP

(57) ABSTRACT

A braking system can include a monitor circuit and/or a contactor control circuit. The braking system utilizes a number of contactors coupled between a power bus. The contactors selectively provide power to resistive elements. The monitor circuit is configured to determine the number of closed contactors of the contactors using current transformers. The contactor control circuit is configured to open and close the contactors. The control circuit includes a solid state timer circuit for each coil associated with the contactors. The solid state timer circuit bypasses a resistive element in series with the coil for a period of time.

15 Claims, 4 Drawing Sheets

BRAKING SYSTEM CONTACTOR CONTROL AND/OR MONITORING SYSTEM AND METHOD

BACKGROUND

The present disclosure relates generally to the field of braking systems. More particularly, the present disclosure relates to contactor control, acknowledgment and/or monitoring methods and systems in vehicle braking systems.

Various vehicles utilize electric motors (e.g., traction motors, alternating current (AC) motors, direct current (DC) motors, etc.) to provide propulsion. Such vehicles include but are not limited to: locomotives, utility vehicles, trucks, busses, monorail vehicles, hybrid vehicles (including hybrid automobiles, trucks, sports utility vehicles, buses, etc.), construction equipment, mining equipment, etc. Vehicles that use electric motors for propulsion can also use an electric motor technique called retard braking to decelerate or retard the motion of the vehicle (brake the vehicle).

Retard braking draws power from the electric motor operating as a generator. The power drawn from the electric motor slows the electric motor which in turn slows the wheels or tracks of the vehicle. Retard braking reduces wear on friction-based braking systems. The power from the motor can be provided to batteries (e.g., in a regenerative braking system) or can be dissipated through resistive or other electrical elements.

In one particular application, super heavy duty trucks such as mining trucks include a retard brake pedal. When the retard brake pedal is engaged, an electronic control system for the vehicle determines the desired deceleration based upon certain factors such as, pedal position, load, speed, etc., and selectively closes electronics, such as, IGBTs, SCRs, electronic switches or contactors to appropriately draw power from the electric motor and brake the vehicle. Each of the switches are disposed in a bank including an energy dissipative network. The energy dissipative network can include electrical elements disposed between a power node and ground node of a direct current (DC) bus which supplies power to and receives power from the electric motor.

Generally, each contactor includes main contacts for its energy dissipative network and a set of auxiliary contacts that are used to control the main contacts and to provide feedback to a vehicle control circuit. The vehicle control circuit can determine which main contacts are closed and opened in response to signals from the auxiliary contacts.

According to one example, the main contacts which are generally normally open contacts are controlled by a control circuit which includes a resistor in series with a coil. Normally closed auxiliary contacts controlled by the coil bypass the resistor in an economizer circuit. The normally closed auxiliary contacts generally are used to reduce the time required to close the main contacts. Once the main contacts are closed (the coil is energized), the normally closed auxiliary contacts are opened and current to the coil is provided through the resistor.

The auxiliary contacts also generally include normally open contacts for providing feedback to the vehicle control circuit for the retard braking operation. In addition, the auxiliary contacts can include normally open contacts for providing fail safe operations. According to one fail safe operation, auxiliary contacts serve as an interlock to prevent closing of remaining main contacts if the main contacts are not closed in the bank that energizes a fan or blower motor for cooling the dissipative networks. The fan motor is generally powered by energy provided from the electric motor for efficiency.

In conventional retard braking systems, auxiliary contacts can be the subjected to dust, carbon monoxide and other contaminants which prevent the auxiliary contacts from opening and closing correctly. Improperly operating auxiliary contacts can result in a drive fault or a loss of retard braking for a short period of time (e.g., a second or less). Although the fault can be reset after the short period of time and retard braking can return to normal operation, the driver may be forced to use friction brakes which require maintenance after using them. In addition, the auxiliary contacts may suffer more permanent malfunctions due to contaminants and require replacement or repair.

Accordingly, there is a need for a system and method that improves contactor monitoring and/or control in a retard braking system. Further still, there is a need for a more reliable retard braking system and method. Yet further still, there is a need for control and/or monitoring circuitry that requires fewer or no auxiliary contacts. Yet further, there is a need for a monitor circuit that senses the number of retard braking contacts that are closed without using auxiliary contacts. Still further, there is a need for an economizer circuit that does not use auxiliary contacts. Even further, there is a need for lower cost, more reliable retard braking systems.

Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a braking system. The braking system can include a monitor circuit or a contactor control circuit. The braking system utilizes a number of contactors coupled between a power bus. The contactors include main contacts that selectively provide power to resistive elements. The monitor circuit is configured to determine the number of closed main contacts of the contactors using current transformers associated with the main contacts. The contactor control circuit is configured to open and close the main contacts. The contactor control circuit includes a solid state timer circuit for each coil associated with the contactors. The solid state timer circuit bypasses a resistive element in series with the coil for a period of time.

Another exemplary embodiment relates to a method of monitoring a number of contacts including first contacts, second contacts, and third contacts in a braking system for a vehicle. The vehicle includes a DC bus. The first contacts, the second contacts, and third contacts are disposed between a first conductor of the DC bus and a second conductor of the DC bus. The method includes receiving a first, second and third sense signal from current transformers associated with each of the first, second and third contacts. The method also includes providing a first, second and third signal representing whether the first, second and third contacts respectively, are closed in response to the respective first sense signal, second sense signal and third sense signal.

Another exemplary embodiment relates to a monitor circuit configured to determine the number of closed contactors in a vehicle braking system. The monitor circuit uses current transformers associated with the contactors.

Another exemplary embodiment relates to a contactor control circuit configured to open and close contactors. The control circuit includes a solid state timer circuit for each coil associated with the contactors. The solid state timer circuit bypasses a resistive element in series with the coil for a period of time.

Another exemplary embodiment relates to a method of controlling a number of contactors in a braking system. First contacts are disposed between a first conductor and a second conductor of a DC bus for dissipating power through resistive elements. The method includes providing current through a coil associated with the first contacts. The current is provided through a solid state switch in a solid state timing circuit. The solid state switch bypasses a resistive element. The method also includes providing the current through the resistive element after a predetermined time period.

BRIEF DESCRIPTION OF THE FIGURES

The exemplary embodiments will become more fully understood from the following detailed description, taken in conjunction with the accompanying drawings, wherein like reference numerals refer to like elements, wherein.

DETAILED DESCRIPTION

Figure 1:
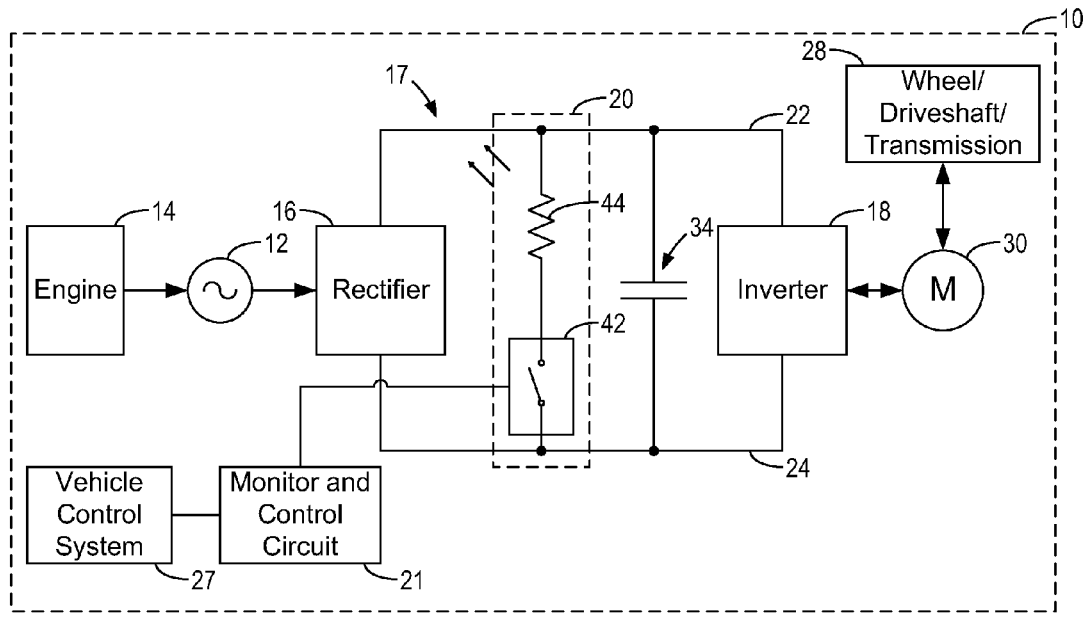
FIG. 1 is a general schematic block diagram of a vehicle including a braking system according to an exemplary embodiment.

Before describing in detail the particular improved system and method, it should be observed that the invention includes a novel structural combination of electrical components and devices, but is not limited to any particular detailed configurations thereof. Accordingly, the structure, methods, software, functions, control and arrangement of the components have been illustrated in the drawings by readily understandable block representations and schematic drawings in order not to obscure the disclosure with the structural details which will be readily apparent to one skilled in the art having the benefit of the description herein. Further, the invention is not limited to the particular embodiments depicted in the exemplary diagrams, but should be construed in accordance with the language of the claims.

Referring generally to the figures, advantageous circuitry is provided for either monitoring or controlling or both monitoring and controlling contactors in a braking circuit. The circuitry reduces the need for auxiliary contacts which provides superior performance in one embodiment. According to one embodiment, the braking system is a retard braking system in a mining vehicle or truck. Alternatively, either the monitoring circuit or the control circuit can be used in other braking systems and other types of vehicles. The monitoring circuit can be implemented using software.

With reference to FIG. 1, a vehicle 10 includes a monitor and control circuit 21 for operation in an electronic braking system. Although monitor and control circuit 21 is described with respect to operation with energy dissipation circuit 20, circuit 21 can be utilized with other types of dissipation circuits including regenerative circuits. Circuits 20 and 21 can be part of a retard braking systems or other type of electric motor-based braking systems.

Vehicle 10 can be any type of vehicle where braking circuits or electronic braking systems are utilized. Vehicle 10 can be but is not limited to: a locomotive, a utility vehicle, a truck, a bus, a monorail vehicle, a hybrid vehicle (including a hybrid automobile, a truck, a sports utility vehicle, a bus, etc.), military equipment, construction equipment, agricultural equipment, forestry equipment, mining equipment, etc. Vehicle 10 includes an engine 14, an alternator 12, a direct current (DC) bus 17, a rectifier 16, an inverter 18, a capacitor bank 34, energy dissipation circuit 20, monitor and control circuit 21, a vehicle control system 27, an electric motor 30, and a wheel 28.

Engine 14 drives alternator 12. Engine 14 can be a heat engine or internal combustion engine. Alternator 12 can be an alternating current (AC) power source, generator, or alternator. Power from alternator 12 is provided to rectifier 16 which provides a direct current (DC) power signal on a DC bus 17. Rectifier 16 can be any arrangement of electrical components for converting AC power to DC power. For example, bridges or arrangements of diodes, thyristors, insulated gate bipolar junction transistors (IGBTs), field effect transistors, etc. can be used to convert AC power from source 12 to DC power for DC bus 17.

DC bus 17 includes a power conductor 22 and a ground conductor 24. Capacitor bank 34 can be provided between conductors 22 and 24. Power dissipation circuit 20 is also coupled between conductors 22 and 24 in one embodiment.

Inverter 18 receives DC power from bus 17 and provides variable AC power for electric motor 30. Inverter 18 can be a variable frequency drive for electric motor 30. Although described below as an AC motor, motor 30 can be a DC motor and be powered from bus 17 via a DC motor control circuit according to one alternative embodiment. Inverter 18 can be any device for controlling power from bus 17 to motor 30. In one embodiment, inverter includes IGBTs, thyristors, transistors, etc. for converting DC power on DC bus 17 to an AC signal for operating electric motor 30. Inverter 18 can also include a transformer for changing the AC voltage provided by inverter 18 in one embodiment.

In one alternative embodiment, vehicle 10 can be an all electric vehicle. In such an alternative embodiment, engine 14 and alternator 12 can be eliminated. In another alternative embodiment, an AC power source such as a rail-based or transmission line-based AC power source can be connected to rectifier 16 directly. Alternatively, alternator 12 and rectifier 16 can be replaced by a DC power source (e.g., a rail-based source, a transmission line-based source or a battery).

Electric motor 30 directly or indirectly drives wheel 28 for motion of vehicle 10. Motor 30 can indirectly drive wheel 28 via a gear, drive shaft, transmission, etc. Wheel 28 can be a set of wheels including rear wheels and front wheels, or can be a track or set of tracks. Motor 30 can be utilized to propel vehicle 10. Return energy from motor 30 can be utilized to brake or retard vehicle 10 by providing current to a energy dissipation circuit 20. Motor 30 can provide the current to DC bus 17. Energy dissipation circuit 20 can be a regenerative circuit or a resistive element braking circuit in one embodiment.

In one embodiment, energy dissipation circuit 20 can include a resistor 44 and a switch 42. Switch 42 is controlled and monitored by monitor and control circuit 21. Switch 42 can be main contacts of a contactor in one embodiment and can be in series with resistor 44 between conductors 22 and 24 of DC bus 17.

Although shown as a normally open contacts or switch in FIG. 1, switch 42 can be a normally closed switch in series with resistor 44 that is opened during non-braking operations.

Resistor 44 can be a single resistor or a bank of resistors. Resistor 44 can have a value of 1-6 ohms and is capable of dissipating large amounts of heat. However, various resistor values can be used depending upon design criteria. Resistor 44 can be a resistor network or grid and include other electrical components such as chokes, inductors, capacitors, diodes, etc. The specific components in FIG. 1 of energy dissipation circuit 20 are not shown in a limiting fashion.

Switch 42 and resistor 44 can represent a bank of switches. Switch 42 is monitored and controlled by monitor and control circuit 21. Monitor and control circuit 21 selectively opens and closes switch 42 in response to at least one control signal from a vehicle control system 27. Monitor and control circuit 21 operates to close the main contacts associated with switch 42 quickly by bypassing a resistive element in series with the contactor coil for a period of time without using an auxiliary contact in one embodiment.

Monitor and control circuit 21 monitors the state of the main contacts associated with switch 42 without using auxiliary contacts in one embodiment. Circuit 21 can provide a signal (e.g., a digital or analog signal) or data representing the status of switch 42 to the vehicle control system 27 in one embodiment. Vehicle control system 27 uses the signal or data representing the status of switch 42 to control switch 42 via monitor and control circuit 21 and to effect an electronic braking operation (e.g., a retard braking operation) in one embodiment.

Figure 2:
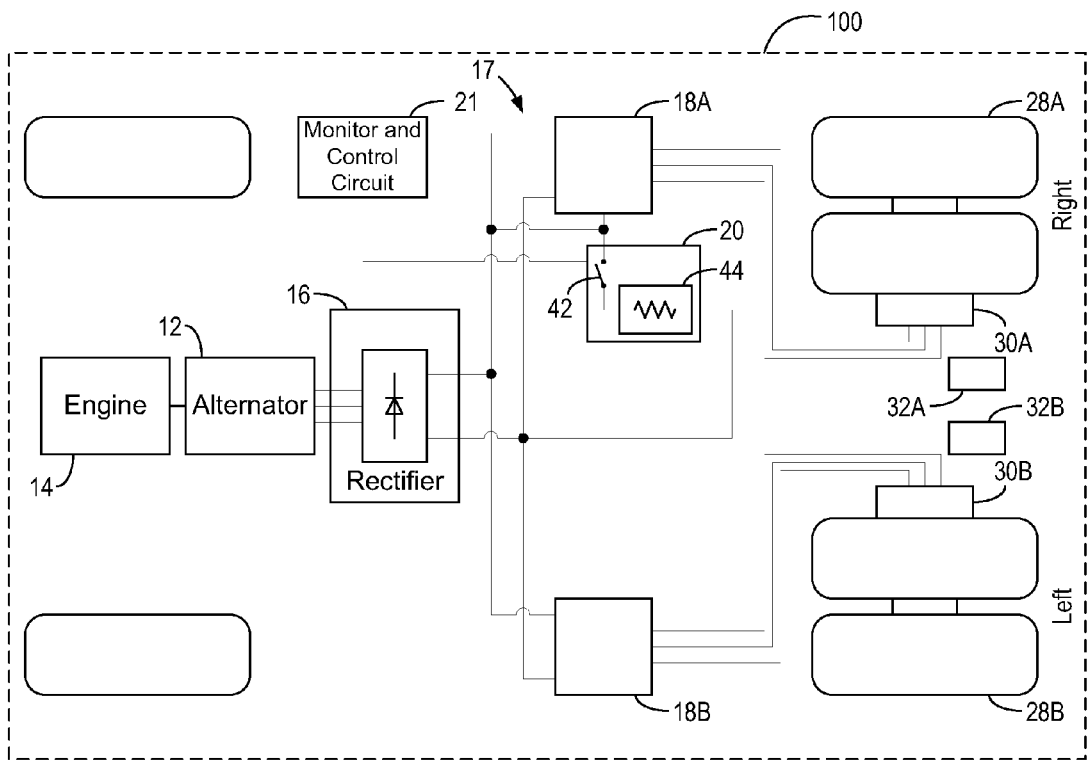
FIG. 2 is a general schematic block diagram of a vehicle including a braking system according to another exemplary embodiment.

With reference to FIG. 2, vehicle 100 is configured as a mining truck according to one exemplary embodiment. Vehicle 100 includes engine 14, alternator 12, and rectifier 16 in one embodiment. In addition, vehicle 100 includes right wheels 28A, left wheels 28B, right motor 30A, left motor 30B, right motor sensor 32A, left motor sensor 32B, monitor and control circuit 21, right inverter 18A, left inverter 18B, and energy dissipation circuit 20 in one embodiment. Motor sensors 32A and 32B can provide signals to vehicle control systems 27 in FIG. 1.

Energy dissipation circuit 20 includes a grid 44 and a switches 42 in one embodiment. Vehicle 100 operates similarly to vehicle 10 described with reference to FIG. 1. Monitor and control circuit 21 can be utilized to dissipate heat energy provided by motors 30A and 30B through energy dissipation circuit 20 and monitor the status of switch 42.

Although vehicle 100 is shown with one circuit 20, one circuit 21, and two inverters 18A-B, any number of these components can be utilized without departing from the scope of the invention. Vehicle 100 can also be configured as a 4 or more wheel drive system including motors and electronic braking systems associated with front wheels in an alternative embodiment.

Figure 3:
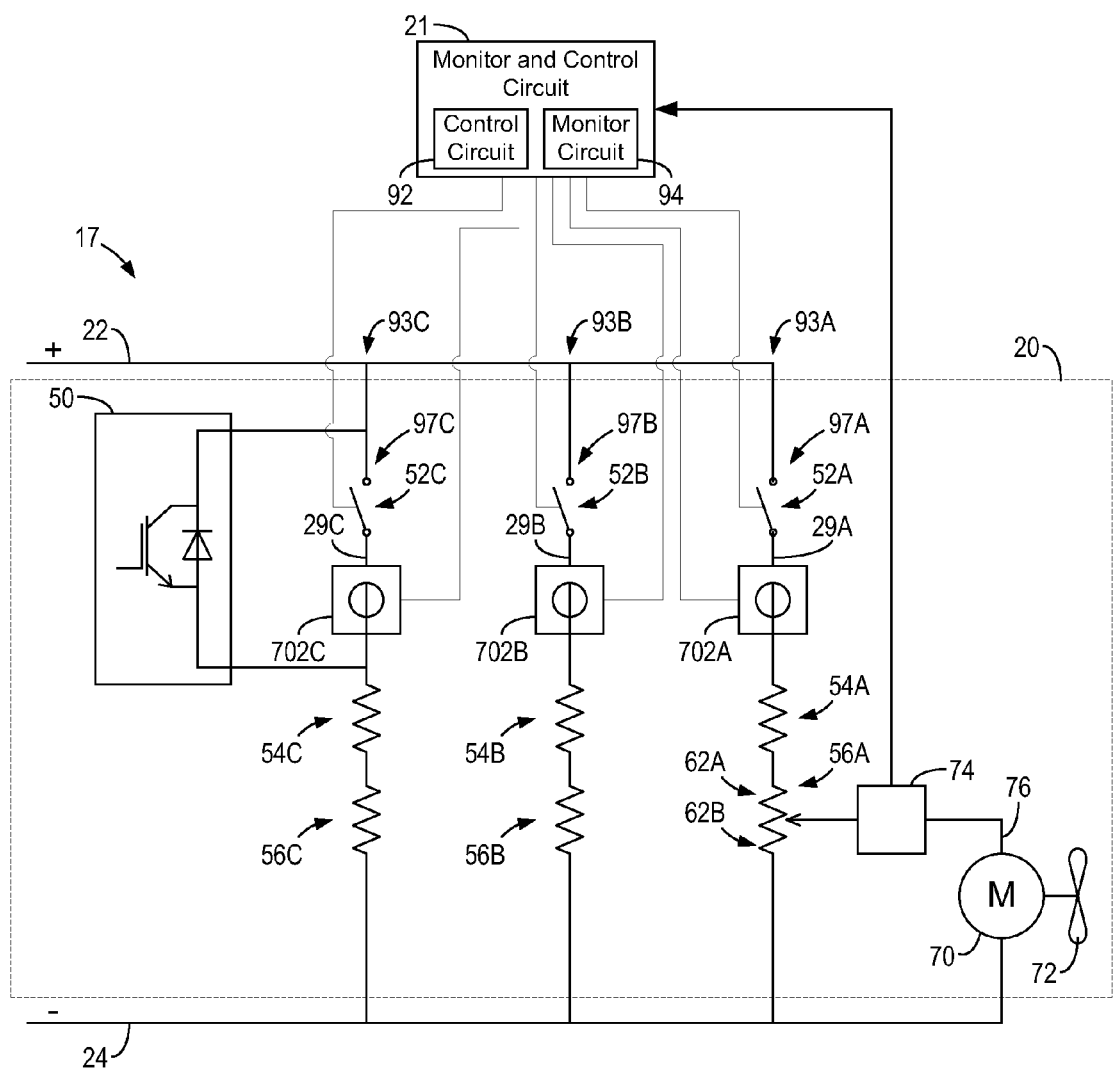
FIG. 3 is a more detailed schematic block diagram of circuitry for the braking systems of the vehicles illustrated in FIGS. 1 and 2, according to yet another exemplary embodiment.

With reference to FIG. 3, monitor and control circuit 21 can be utilized in vehicle 10 or vehicle 100 in one embodiment. Monitor and control circuit 21 shown in FIG. 3 can be monitor and control circuit 21 shown in FIG. 1 or 2. Monitor and control circuit 21 includes a control circuit 92 and a monitor circuit 94 in one embodiment.

Energy dissipation circuit 20 is arranged in three branches 93A-C in one embodiment. Branches 93 A-C can be respectively comprised of switches 52A-C, resistors 54A-C and resistors 56A-C. Switch 42 in FIG. 1 can represent switches 52A-C in one embodiment. Branches 93A-C can include respective conductors 29A-C associated with a respective contactors 97A-C and can be coupled between conductors 22 and 24 of DC bus 17 in one embodiment. Conductors 29A-C can be located between, in front of, or behind resistors 54A-C and 56A-C.

A circuit 50 can be provided as a transient chopper to adjust voltage between conductors 22 and 24 of DC bus 17 in one embodiment. Circuit 50 is optional and can be in parallel with one or more resistors associated with energy dissipation circuit 20.

Switches 52A-C can be main contacts associated with respective contactors 97A-C in one embodiment. Resistors 54A-C and 56A-C can represent a number of resistors or resistive banks. Resistor 56A is comprised of a resistive portion 62A and a resistive portion 62B. Resistor 56A can be a potentiometer. Resistors 54A-C and 56A-C have values of 0.1-1.0 ohms in one embodiment and can be represented by resistor 44 in FIG. 1 in one embodiment.

Control circuit 92 controls main contacts or switches 52A-C through electromagnetic coupling via a respective coils 330A-C (FIG. 4) in one embodiment. Energizing coils 330A-C closes respective switches 52A-C (e.g., embodied as normally open main contacts), and deenergizing coils 330A-C opens respective switches 52A-C in one embodiment.

When switch 52A in branch 93A is closed to effect electronic braking such as retard braking, current from electric motor 30 (FIG. 1) travels through switch 52A, resistor 54A, resistor 56A and a conductor 76 to motor 70. Motor 70 drives a blower or fan 72. Fan 72 is disposed to provide air to cool resistors 54A-C and 56A-C. A sensor 74 is disposed to provide a sense signal indicative of power (e.g., current or voltage) provided to motor 70. When switches 52B and 52C are closed, current from motor 30 and bus 17 travels through respective resistors 54B and 56B and respective resistors 54C and 56C in branches 93B and 93C.

Sensor 74 can be any type of device for monitoring power to motor 70 or indicating the operational status of fan 72. Sensor 74 can be a current sensor or current transformer such as a coil disposed around conductor 76, a voltage sensor, or any device for providing an indication of current or voltage provided to motor 70. Sensor 74 provides the sense signal indicative of the status of motor 70 to monitor circuit 94 in one embodiment.

Monitor circuit 94 includes current transformers 702A, 702B and 702C and monitors the current in conductors 29A-C to determine the number of switches 52A-C that are closed in one embodiment. Any current sensing device can be utilized to provide sense signals representative of current through conductors 29A-C. Transformers 702A, 702B and 702C can be located anywhere suitable to detect current in branches 97A-C on through switches 52A-C. Transformer 702A can be eliminated if the signal from sensor 74 can be relied upon to detect that switch 52A is closed. Control circuit 92 operates to open and close switches 52A-C in response to control signals from vehicle control circuit 27 or other vehicle control circuitry. Generally, circuit 92 operates to close switch 52A before or simultaneously with switch 52B and 52C to ensure that fan 72 is engaged to cool resistive elements 54A-C and 56A-C when braking occurs. Fan 72 advantageously utilizes "wasted energy" for operation.

Figure 4:
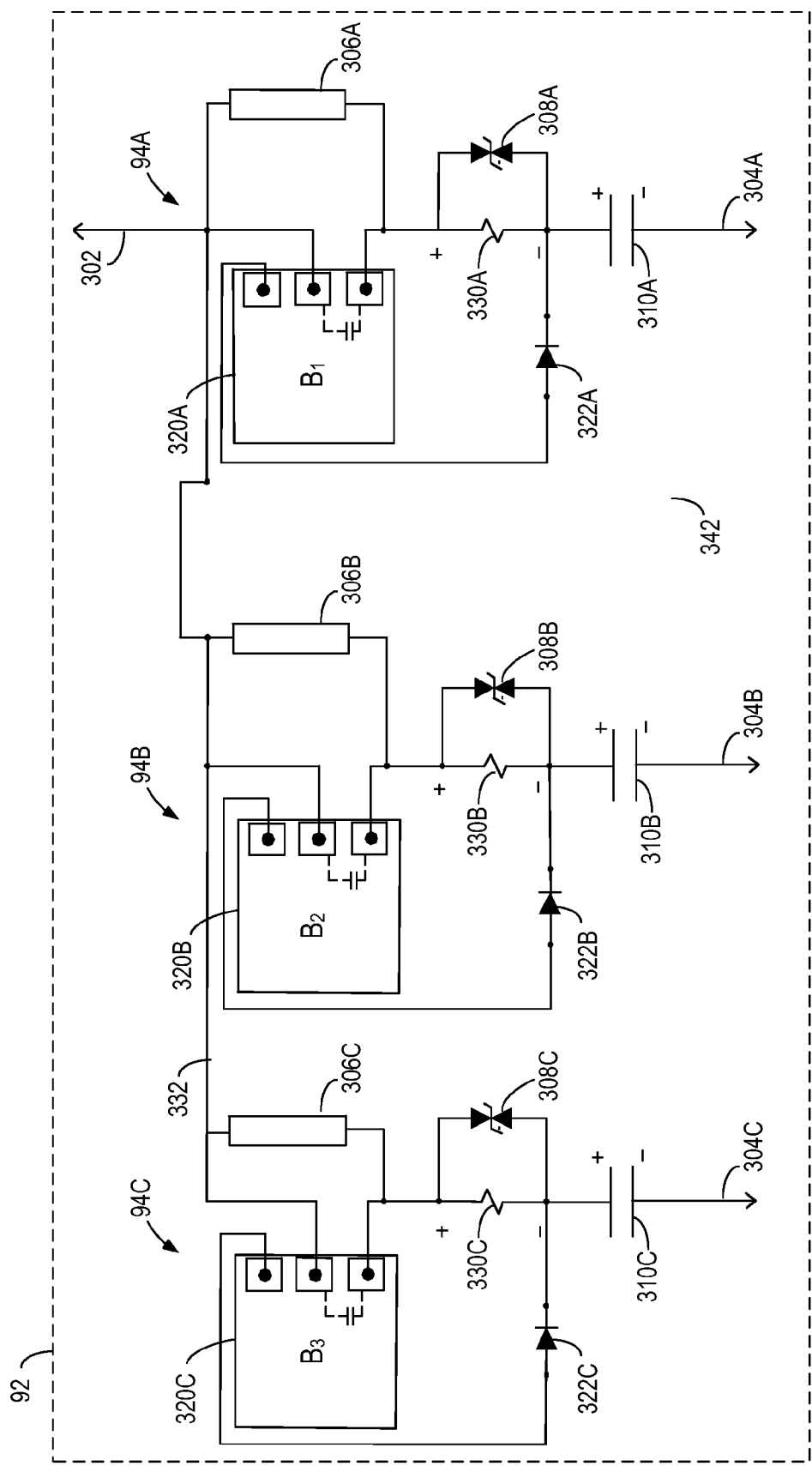
FIG. 4 is an electrical schematic diagram of a control circuit for the circuitry illustrated in FIG. 3, according to still another exemplary embodiment.

With reference to FIG. 4, control circuit 92 can be arranged in branches 94A-C for each of switches 52A-C in one embodiment. The number of branches 94 A-C are not discussed in a limiting fashion.

Each branch 94A-C includes a respective solid state timing circuit 320A-C, a diode 322A-C, a contactor 310A-C, a ground connection 304A-C, a coil 330 A-C, and a double anode zener diode 308A-C in one embodiment. Branches 94A-C are controlled by respective contactors 310A-C.

Solid state timing circuits 320A-C each include normally open solid state switches in one embodiment. Contactors 310A-C are controlled in accordance with vehicle operation parameters and can be opened and closed in response to signals from vehicle control system 27 or other vehicle control circuitry to effect retard braking in one embodiment. In one embodiment, contactor 310A is closed before or simultaneously with contacts 310B and 310C to ensure that fan 72 is operating when switches 52B and 52C are closed.

When contactor 310A is closed, current is provided from a power node 302 through solid state timer circuit 320A to coil 330A associated with switch 52A through contactor 310A to ground connection 304A. Connection of solid state timer circuit 320A to ground connection 304A via diode 322A energizes circuit 320A, thereby closing the normally open solid state switch for a period of time. The period of time can be set by configuring or programming circuit 320A.

When the solid state switch in solid state timer circuit 320A is closed, coil 330A is energized. The solid state switch remains closed for a period of time. In one embodiment, the period of time is approximately 0.2 seconds. Alternative time periods can be chosen depending upon design criteria and system parameters.

After the time period expires, the solid state switch in solid switch timer circuit 320A is opened and power is provided from node 302 through resistor 306A and coil 330A as long as contactor 310A is closed. Solid state timer circuit 320A keeps its switch open after the time period is elapsed until reset by deenergizing circuit 320A by opening contactor 314A. The current provided through coil 330A closes switch 52A.

Once contactor 310A is opened, coil 330A is deenergized and switch 52A is opened. Opening contactor 310A effectively resets solid state timer circuit 320A.

Alternatively, circuit 320A can include a trigger input and a reset input and remain constantly powered. In an alternative embodiment, the trigger signal and reset signal are used to control the switch in circuit 320A and reset the time period rather than using contactor 310A to energize and deenergize circuit 320A.

If switch 52A (main contact) does not function for any reason, vehicle 10 or 100 is stopped after a couple millisecond delay in one embodiment. Monitor and control circuit 21 can provide signals to vehicle control system 27 stop vehicle 10 or 100 in one embodiment.

Advantageously, control circuit 92 minimizes the use of auxiliary contactors. The use of solid state timing circuits 320A-C allow coils 330A-C to be energized more quickly as resistors 306A-C are bypassed.

Figure 5:
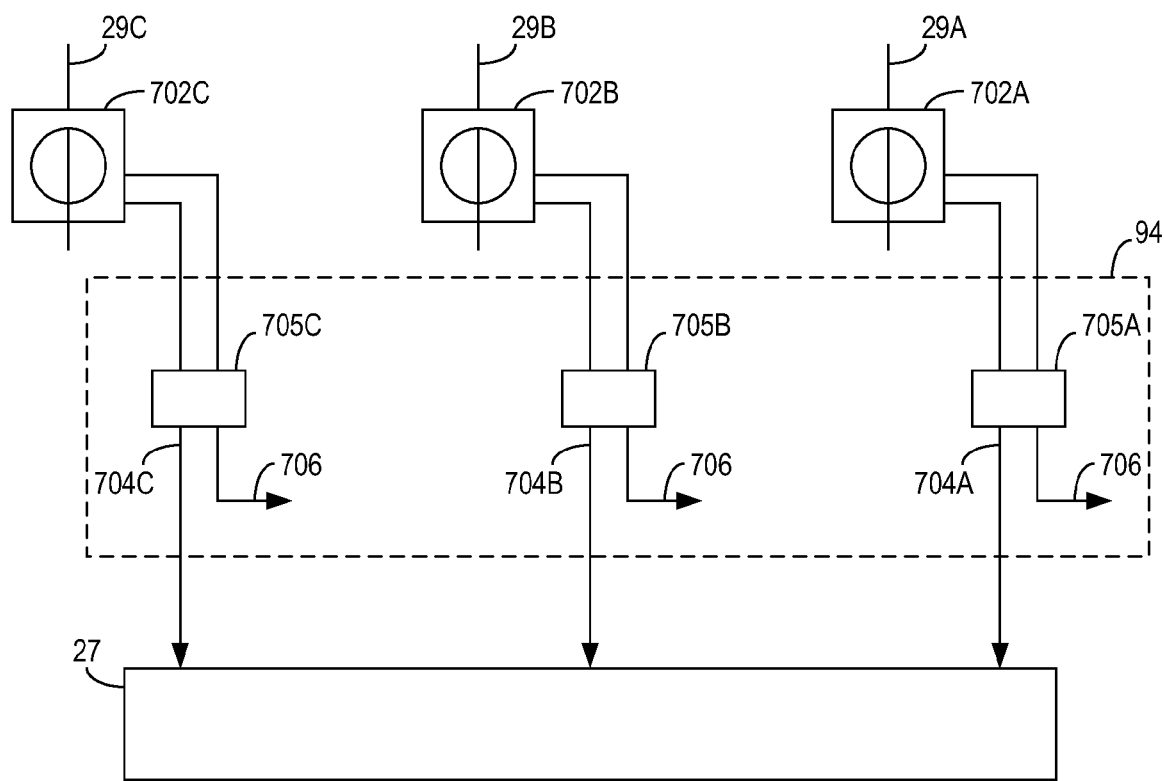
FIG. 5 is a schematic block diagram of a monitoring circuit for the circuitry of FIG. 3 in accordance with another exemplary embodiment.

With reference to FIG. 5, monitor circuit 94 is coupled to vehicle control circuit 27 for vehicle 10 or vehicle 100 in one embodiment. Monitor circuit 94 provides signals or data indicative of which switches of switches 52A-C are closed at outputs 704A-C. Monitor circuit 94 determines which switches 52A-C are closed using the sense signals from transformers 702A-C. Filters can condition the sense signals.

In one embodiment, monitor circuit 94 includes a set of three solid state relays 705A-C for amplifying or conditioning the outputs of transformers 702A-C. Current transducers or transformers 702A-C provide a signal representing the current in respective conductors 29A-C to respective solid state relays 705A-C in one embodiment. Relays 705A-C include a first input coupled to a power node 706 and an output coupled to respective outputs 704A-C. The signal provided on outputs 704A-C can be provided to vehicle control system 27 indicating whether switches 52A-C are open or closed.

Current transformer 702A can be sensor 74 or be replaced with sensor 74. Applicants have found that circuit 94 is stable in percipitative conditions or on difficult roads due to slip/slid conditions. Node 706 does not necessarily need to be a power node but can be another signal node.

Solid state relays 705A-C include a respective solid state switch between node 706 and respective outputs 704A-C in one embodiment. Current from respective transformers 702A-C closes the solid state switch in respective solid state relays 705A-C to provide the feedback signal in one embodiment. Alternatively, circuits such as comparators, filters, etc. can be used to provide signals representing closed switches 52A-C to outputs 704A-C. Transformers 702A-C and relays 705A-C remove the need for normally open auxiliary contacts used in conventional systems in one embodiment.

Control and monitor circuit 21 including circuits 92 and 94 can be provided in part by a processor executing software to perform functions as described herein in one embodiment. Alternatively, other circuitry can be utilized for implementing circuits 92 and 94 including programmable logic devices, ASIC devices, hardware circuitry, etc. Resistors 306A-C can have a value of 4.2 ohms and stages or branches 94A-C can be provided in inverter frames associated with vehicle 10.

It is understood that while the detailed drawings, specific examples, steps, and particular values given provide one exemplary embodiment of the present invention, the exemplary embodiment is for the purpose of illustration only. The method and apparatus of the invention is not limited to the precise details and conditions disclosed. For example, although specific types of signals, time periods, component values and thresholds are mentioned, other types of signals and parameters can be utilized. Further, circuitry components and the number and arrangement of components can be changed or modified without department from the scope of the claims. Various changes may be made to the details disclosed without departing from the spirit of the invention which is defined by the following claim.

What is claimed is:

1. A method of monitoring a plurality of contacts including first contacts, second contacts, and third contacts in a braking system for a vehicle, the vehicle including a power bus, the first contacts, the second contacts, the third contacts disposed between a first conductor of the power bus and a second conductor of the power bus, the method comprising:

receiving a first sense signal from a first current transformer, a second sense signal from a second current transformer and a third sense signal from a third current transformer, each of the first, second, and third sense signals being representative of a current through a set of three respective conductors between the first conductor and the second conductor, wherein the first current transformer, the second current transformer, and the third current transformer include a coil disposed around a conductor;

providing a first signal representing whether the first contacts are closed in response to the first sense signal, a second signal representing whether the second contacts are closed in response to the second sense signal, and a third signal representing whether the third contacts are closed in response to the third sense signal, wherein a set of three solid state relays provide the first, second, and third signals; and opening and closing the first, second, and third contacts using a solid state timer, wherein the solid state timer bypasses respective resistors in series with respective coils for a period of time, wherein the period of time begins after control contacts are closed, the control contacts being in series with the respective coils and the solid state timer.

2. The method of claim 1, wherein the first sense signal is provided to a solid state relay.

3. The method of claim 1, wherein the first, second and third signals are provided as data.

4. The method of claim 1, wherein each contact has a solid state timer associated therewith.

5. The method of claim 4, wherein each of the solid state timers include a normally open switch.

6. The method of claim 5, wherein each of the solid state timers bypass the respective resistors in series with respective coils for 0.2 seconds.

7. An apparatus for a braking system including a plurality of contactors each having a first coil associated therewith, the contactors including main contacts coupled between a power bus, the contactors selectively providing power to resistive elements, the apparatus comprising:
    a monitor circuit configured to determine the number of closed main contacts of the contactors using signals from current transformers associated with the main contacts, wherein the current transformers include a second coil disposed around a conductor, and wherein the monitor circuit includes three solid state relays; and
    a contactor control circuit configured to open and close the main contacts, the control circuit comprising a solid state timer circuit for each first coil associated with the contactors, the solid state timer circuit bypassing a resistive element in series with the first coil for a period of time, wherein the period of time begins after control contacts are closed, the control contacts being in series with the first coil and the solid state timer circuit.

8. The apparatus of claim 7, wherein the period of time is 0.2 seconds.

9. The apparatus of claim 7, wherein a diode is coupled to a node between the first coil and control contacts.

10. The apparatus of claim 7, wherein the solid state timer comprises a normally open solid state switch in series with the first coil.

11. The apparatus of claim 10, wherein the signals include three signals from three current transformers about three respective conductors associated with the main contacts.

12. A method of controlling at least one contactor in a braking system, the main contacts for the contactor being disposed between a first conductor and a second conductor of a DC bus for dissipating power, the method comprising:
    providing current through a first coil associated with the contactor, the current being provided through a solid state switch in a solid state timing circuit, the solid state switch bypassing a resistive element in series with the first coil;
    providing the current through the resistive element after a predetermined time period, wherein the predetermined time period begins when the solid state timing circuit is energized; and
    monitoring current through the main contacts via three solid state relays and a current transformer about a conductor coupled to the main contacts, wherein the current transformer includes a second coil disposed around a conductor.

13. The method of claim 12, wherein the solid state timing circuit is energized by connecting the solid state timing circuit to the second conductor.

14. The method of claim 12, wherein the solid state switch remains open until the solid state timing circuit is reset.

15. The method of claim 12, wherein the predetermined time period is 0.2 seconds.

* * * * *